United States Patent [19]

Pompon et al.

[11] 4,217,444

[45] Aug. 12, 1980

[54] METHOD OF DEGASSING POLYMERS PREPARED BY MASS POLYMERIZING A MONOMERIC COMPOSITION BASED ON VINYL CHLORIDE

[75] Inventors: Jean-Bernard Pompon, Saint-Auban; Salomon Soussan, Saint-Symphorien d'Ozon, both of France

[73] Assignee: Rhone-Poulenc Industries, Paris, France

[21] Appl. No.: 878,321

[22] Filed: Feb. 16, 1978

Related U.S. Application Data

[63] Continuation of Ser. No. 666,049, Mar. 11, 1976, abandoned.

[30] Foreign Application Priority Data

Mar. 28, 1975 [FR] France .................................. 75 09798

[51] Int. Cl.² .......................... C08F 6/28; C08F 14/06
[52] U.S. Cl. ...................................... 528/499; 526/75; 526/344.1; 528/483; 528/501; 528/503
[58] Field of Search ........................ 528/499, 501, 503

[56] References Cited

U.S. PATENT DOCUMENTS 3,793,259  2/1974  Brinkmann ........................ 526/344.1
3,956,249  5/1976  Goodman ............................ 528/500

FOREIGN PATENT DOCUMENTS 2331895  1/1974  Fed. Rep. of Germany ........... 528/500
1040114  8/1966  United Kingdom ................. 526/344.1

*Primary Examiner*—C. A. Henderson
*Attorney, Agent, or Firm*—McDougall, Hersh & Scott

[57] ABSTRACT

An improved method of degassing polymers and copolymers prepared by mass polymerizing a monomeric composition, based on vinyl chloride. The polymer is kept under agitation, the monomeric composition to be eliminated is brought from polymerization pressure to a pressure below 120 mm of mercury, the polymer is brought to or kept at a temperature of at least 70° C. and below the temperature at which degradation of the polymer or copolymer commences, and these conditions of pressure and temperature are maintained substantially until the degassing process stops, the polymer being put into contact with a quantity of water representing 0.01 to 0.8% and preferably 0.05 to 0.5% of its weight, after the residual monomeric vinyl chloride content of the polymer or copolymer has been reduced below 2000 ppm. The polymers and copolymers obtained, before being placed in open air, have a residual monomeric vinyl chloride content which is less than 50 ppm, generally less than 20 ppm and may be as little as 1 ppm.

6 Claims, No Drawings

METHOD OF DEGASSING POLYMERS PREPARED BY MASS POLYMERIZING A MONOMERIC COMPOSITION BASED ON VINYL CHLORIDE

This application is a continuation of application Ser. No. 666,049, filed Mar. 11, 1976, and entitled "Method of Degassing Polymers and Copolymers Prepared by Mass Polymerizing Monomeric Compositions Based on Vinyl Chloride", which application is now abandoned.

The invention relates to a method of degassing polymers and copolymers prepared by mass polymerizing a monomeric composition based on vinyl chloride and to polymers and copolymers containing a small proportion of residual monomeric vinyl chloride obtained by the method.

The presence of residual monomeric vinyl chloride in polymers and copolymers based on vinyl chloride has disadvantages, including the following: the danger of producing mixtures which explode with ambient air, the danger of contaminating the air in workshops where the polymers and copolymers are handled, and the danger of microbubbles being present in finished articles prepared from the polymers or copolymers. Thus attempts are being made to minimize the content of residual monomeric vinyl chloride.

In the preparation of polymers and copolymers based on vinyl chloride in a mass, when the conversion of the monomeric composition has reached the desired degree, a polymer is obtained which then undergoes degassification designed to remove the unreacted monomer from the polymers or copolymers.

The degassing treatment is carried out with agitation. The monomeric composition to be eliminated is brought from polymerization pressure to a pressure generally within the range of 50 to 180 mm of mercury; the polymer is brought to or kept at a temperature of at least 70° C. and below the temperature at which degradation of the polymer or copolymer commences, and these pressure and temperature conditions are maintained until the end of the degassing process.

The degassing time varies generally from 60 to 120 minutes. It is obviously longer, the lower the degassing rate of the monomeric composition. The degassing rate is controlled so that the monomeric composition to be eliminated can be brought from polymerization pressure to a pressure of about 4 bars in 20 to 60 minutes. Below this approximate pressure level the degassing rate of the monomeric composition is higher—all other things being equal—the higher the temperature of the polymer. In practice, the polymer is heated as soon as the degassing process starts, so that it can, where appropriate, be brought rapidly to the temperature stipulated or so that it can be kept there.

When the degassing process has stopped, the polymers or copolymers are brought to atmospheric pressure by means of nitrogen before being placed in open air. This step is generally followed by a screening operation designed to eliminate coarse particles.

The polymers and copolymers obtained contain at least 80 ppm and generally from 100 to 500 ppm of residual monomeric vinyl chloride.

In applicants' French patent application, National Registration No. 75.06291, now French Pat. No. 2,302,306 description is made of a method of degassing polymers and copolymers, prepared by mass polymerizing a monomeric composition based on vinyl chloride.

The products obtained from this process have a residual monomeric vinyl chloride content which is less than 50 ppm, generally less than 20 ppm and which may be as little as 1 ppm. The process, during which the polymer is kept under agitation, comprises bringing the monomeric composition to be eliminated from polymerization pressure to a pressure below 120 mm of mercury, bringing the polymer to or keeping it at a temperature of at least 70° C. and below the temperature at which degradation of the polymer or copolymer commences, and maintaining these conditions of pressure and temperature substantially until the degassing process stops; the degassing rate of the monomeric composition is controlled so that the time taken to bring the monomeric composition to be eliminated from polymerization pressure to a pressure of 4 bars is less than 10 minutes.

When the degassing process has stopped, the polymers or copolymers are brought to atmospheric pressure by means of an inert gas such as nitrogen, before being placed in open air. This step is generally followed by a screening operation designed to eliminate coarse particles.

Applicants have now discovered that polymers or copolymers degassed by the methods described above have a residual monomeric vinyl chloride content of over 300 ppm, after the degassing process has stopped but before they are placed in open air. With the described method, the drop in the content of residual monomeric vinyl chloride to levels below 300 ppm or even to 50 ppm or as little as 1 ppm, which risks contaminating ambient air, thus takes place when the polymers or copolymers have been placed in open air and particularly during the conveying and screening operations.

Before they are placed in open air, polymers and copolymers degassed by the method of the invention have a residual monomeric vinyl chloride content which is less than 50 ppm, generally less than 20 ppm and may be as little as 1 ppm.

The method of the invention, for degassing polymers and copolymers prepared by polymerizing a monomeric composition based on vinyl chloride in a mass, comprises keeping the polymer under agitation, bringing the monomeric composition to be eliminated from polymerization pressure to a pressure below 120 mm of mercury, bringing the polymer to or keeping it at a temperature of at least 70° C. and below the temperature at which degradation of the polymer or copolymer commences, and maintaining these conditions of pressure and temperature substantially until the degassing process stops, the polymer being put into contact with a quantity of water representing 0.01 to 0.8% and preferably 0.05 to 0.5% of its weight, after the residual monomeric vinyl chloride content of the polymer or copolymer has been reduced below 2000 ppm.

Applicants have in fact made the surprising discovery that a small quantity of water put into contact with the polymer, under the conditions according to the invention, made the degassing process more efficient. The water may be added to the polymer in one or more stages.

In a modified embodiment of the invention, the polymer is put into contact with an inert gas such as nitrogen during the degassing process and after the monomeric composition to be eliminated has been brought to a pressure below 120 mm of mercury. The inert gas may be added to the polymer in one or more stages.

In order to reduce the degassing time, it is obviously advantageous to heat the polymer right from the beginning of the degassing process. Degassing then generally takes from 60 to 120 minutes. When the process has stopped, the polymers or copolymers are brought to atmospheric pressure by introducing an inert gas, such as nitrogen, before placing them in open air.

Some examples will now be given of the preparation of polymers and copolymers based on vinyl chloride in a mass, and of the application of the degassing process according to the invention. The AFNOR viscosity index of the polymers and copolymers is determined in accordance with NFT Standard 51 013.

EXAMPLE 1

This example is given as a comparison.

2200 kg of vinyl chloride is placed in a pre-polymerizer having a capacity of 3.5 $m^3$, made of stainless steel and equipped with a turbine agitator, and the apparatus is purged by degassing 200 kg of vinyl chloride. 41.7 g of acetylcyclohexane sulphonyl peroxide, corresponding to 3 g of active oxygen, and 189 g of ethyl peroxydicarbonate, corresponding to 17 g of active oxygen, are also fed in. The agitating speed is set to 190 R.P.M.

The temperature of the reaction medium in the prepolymerizer is brought to and kept at 69° C., corresponding to a relative pressure of 11.5 bars in the prepolymerizer.

After 25 minutes of pre-polymerization, the conversion rate being approximately 12%, the pre-polymer is transferred to a vertical polymerizer with a capacity of 8 $m^3$, made of stainless steel and equipped with a double jacket. It has been purged, at a preliminary stage, by degassing 200 kg of vinyl chloride and now contains 2000 kg of vinyl chloride, 133.5 g of ethyl peroxydicarbonate, corresponding to 12 g of active oxygen, and 1368 g of lauroyl peroxide, corresponding to 55 g of active oxygen. The polymerizer is equipped with a helical ribbon agitator. Agitating speed is set to 30 R.P.M. The temperature of the reaction medium is brought rapidly to 69° C. and kept there; this corresponds to a relative pressure of 11.5 bars in the polymerizer.

After 3.5 hours of polymerization at 69° C., the temperature of the water circulating in the double jacket of the polymerizer is brought to 75° C. and the polymer is degassed. The monomer is recovered in a tank set aside for the purpose, containing monomer at an absolute pressure of 4 bars.

The monomer to be eliminated is first brought to an absolute pressure of 4 bars by direct degassing in 50 minutes, then a compressor is used to bring it to a pressure of 110 mm of mercury, and that pressure is maintained until the degassing process has stopped.

The temperature of the polymer had risen to 75° C. five minutes after the water had been put into circulation at 75° C. in the double jacket of the polymerizer. It is now kept at 75° C. until degassing is over. The degassing process takes 120 minutes.

After the polymer has been degassed and the vacuum broken by the introduction of nitrogen, the polyvinyl chloride present in the polymerizer is found to contain 350 ppm of residual monomeric vinyl chloride.

2760 kg of polyvinyl chloride with an AFNOR viscosity index of 78 is collected. The proportion of polymer passing through a screen, with a mesh size of 630 microns, represents 97% by weight, has an apparent weight per unit volume of 0.59 g/$cm^3$ and has a grain-size distribution with an average diameter of 110 microns.

EXAMPLE 2

Polymerization conditions are identical with those in example 1.

After 3.5 hours of polymerization at 69° C., the temperature of the water circulating in the double jacket of the polymerizer is brought to 75° C. and the polymer is degassed. The monomer is recovered in the tank set aside for the purpose, containing monomer at an absolute pressure of 4 bars.

The monomer to be eliminated is first brought to an absolute pressure of 4 bars by direct degassing in 50 minutes, then it is brought to a pressure of 110 mm of mercury with the compressor used in example 1.

When the residual monomeric vinyl chloride content of the polymer present in the polymerizer drops below 2000 ppm, 30 minutes after the compressor has been set in operation, 0.5 kg of water is fed into the polymerizer. The pressure in the polymerizer is returned to 110 mm of mercury and kept at that level until the degassing process has stopped.

The temperature of the polymer, which had risen to 75° C. five minutes after the water was put into circulation at 75° C. in the double jacket of the polymerizer, is now kept at 75° C. until degassing is over. The degassing process takes 120 minutes.

When the polymer has been degassed and the vacuum broken by the introduction of nitrogen, the polyvinyl chloride present in the polymerizer is found to contain 3 ppm of residual monomeric vinyl chloride.

2800 kg of polyvinyl chloride, with an AFNOR viscosity index of 78, is collected. The proportion of polymer passing through a screen, with a mesh size of 630 microns, represents 97% by weight and has an apparent weight per unit volume of 0.60 g/$cm^3$ and a grain size distribution with an average diameter of 108 microns.

EXAMPLE 3

This example is given as a comparison.

8250 kg of vinyl chloride is fed into a pre-polymerizer with a capacity of 14 $m^3$, made of stainless steel and equipped with a turbine agitator, and the apparatus is purged by degassing 1000 kg of vinyl chloride. 417 g of acetylcyclohexane sulphonyl peroxide, corresponding to 30 g of active oxygen, and 779 g of ethyl peroxydicarbonate, corresponding to 70 g of active oxygen, are also introduced. The agitating speed is set to 75 R.P.M.

The temperature of the reaction medium in the prepolymerizer is brought to 70° C. and kept there; this corresponds to a relative pressure of 11.5 bars in the pre-polymerizer.

After 10 minutes of pre-polymerization, the conversion rate being approximately 10%, the pre-polymer is transferred to a horizontal polymerizer with a capacity of 25 $m^3$, made of stainless steel and equipped with a double jacket. The polymerizer has been purged at a previous stage by degassing 1000 kg of vinyl chloride and now contains 5750 kg of vinyl chloride, 1931 g of acetylcyclohexane sulphonyl peroxide, corresponding to 139 g of active oxygen, and 1524 g of ethyl peroxydicarbonate, corresponding to 137 g of active oxygen. The polymerizer is equipped with an agitator of the frame type. Agitating speed is set to 8 R.P.M. The temperature of the reaction medium is brought rapidly to 55° C. and kept there; this corresponds to a relative pressure of 8.1 bars in the polymerizer.

After 4.25 hours of polymerization at 55° C. the temperature of the water circulating in the double jacket of the polymerizer is brought to 80° C. and the polymer is degassed. The monomer is recovered in a tank set aside for the purpose, containing the monomer at an absolute pressure of 4 bars.

The monomer to be eliminated is first brought to a pressure of 4 bars by direct degassing in 50 minutes, then brought to a pressure of 100 mm of mercury with a compressor.

The absolute pressure in the polymerizer is brought to 1 bar by a first introduction of nitrogen, then a vacuum pump with its output directed to an adjoining tank is used to bring the absolute pressure in the polymerizer to 60 mm of mercury.

The absolute pressure in the polymerizer is restored to 1 bar by a second introduction of nitrogen, and is then returned to 60 mm of mercury by means of the vacuum pump.

The temperature of the polymer rose to 80° C. ten minutes after water at 80° C. had been put into circulation in the double jacket of the polymerizer. It is now kept at 80° C. until degassing is over. The degassing process lasts 120 minutes.

When the polymer has been degassed and the vacuum broken by the introduction of nitrogen, the polyvinyl chloride present in the polymerizer is found to contain 320 ppm of residual monomeric vinyl chloride.

11200 kg of polyvinyl chloride, with an AFNOR viscosity index of 109, is collected. The proportion of polymer passing through a screen with a mesh size of 630 microns represents 99% by weight and has an apparent weight per unit volume of 0.60 g/cm$^3$ and a grain size distribution with an average diameter of 145 microns.

EXAMPLE 4

Polymerization conditions are identical with those in Example 3.

After 4.25 hours of polymerization at 55° C., the temperature of the water circulating in the double jacket of the polymerizer is brought to 80° C. and the polymer is degassed. The monomer is recovered in the tank set aside for the purpose, containing monomer at an absolute pressure of 4 bars.

The monomer to be eliminated is first brought to an absolute pressure of 4 bars by direct degassing in 50 minutes, and is then brought to a pressure of 100 mm of mercury with the compressor used in Example 3.

When the residual monomeric vinyl chloride content of the polymer in the polymerizer drops below 2000 ppm (this happens 30 minutes after the compressor has been set in action), 80 kg of water is fed into the polymerizer.

Absolute pressure in the polymerizer is brought to 1 bar with a first introduction of nitrogen, then to 60 mm of mercury by means of the vacuum pump used in Example 3, with its output directed to an adjoining tank.

Absolute pressure in the polymerizer is brought to 1 bar by a second introduction of nitrogen, then returned to 60 mm of mercury by means of the vacuum pump.

The temperature of the polymer, which rose to 80° C. ten minutes after water at 80° C. had been put into circulation in the double jacket of the polymerizer, is now kept at 80° C. until degassing is over. The degassing process takes 120 minutes.

After the polymer has been degassed and the vacuum broken by the introduction of nitrogen, the polyvinyl chloride in the polymerizer is found to contain 1 ppm of residual monomeric vinyl chloride.

11200 kg of polyvinyl chloride, with an AFNOR viscosity index of 109, is collected. The proportion of polymer passing through a screen with a mesh size of 630 microns represents 99% by weight and has an apparent weight per unit volume of 0.60 g/cm$^3$ and a grain size distribution with an average diameter of 145 microns.

EXAMPLE 5

This example is given as a comparison.

The pre-polymerizer used has a capacity of 200 liters and is made of stainless steel and equipped with an agitator, comprising a turbine of the "Lightnin" type with 6 flat blades 215 mm in diameter. 133 kg of vinyl chloride is placed in the polymerizer and the apparatus is purged by degassing 10 kg of vinyl chloride. 2 kg of vinyl acetate, 11.1 g of acetylcyclohexane sulphonyl peroxide, corresponding to 0.8 g of active oxygen, and 7.8 g of ethyl peroxydicarbonate, corresponding to 0.7 g of active oxygen, are also introduced. The agitating speed is set to 400 R.P.M.

The temperature of the reaction medium in the prepolymerizer is brought to 70° C. and kept there; this corresponds to a relative pressure of 11.3 bars in the pre-polymerizer.

After 20 minutes of pre-polymerization, the conversion rate being approximately 10%, the pre-polymer is transferred to a vertical polymerizer with a capacity of 400 liters, made of stainless steel and equipped with a double jacket. The polymerizer had been purged at a preliminary stage by degassing 18 kg of vinyl chloride and now contains 127 kg of vinyl chloride, 3 kg of vinyl acetate, 33.3 g of acetylcyclohexane sulphonyl peroxide, corresponding to 2.4 g of active oxygen, and 50 g of ethyl peroxydicarbonate, corresponding to 4.5 g of active oxygen. The polymerizer is equipped with two independently controlled agitators: one A comprises a ribbon coiled in helical windings on a rotary shaft extending across the upper part of the polymerizer along its axis, and the other B comprises two arms which correspond in shape to the bottom of the autoclave and which are connected to a pivot extending across the bottom of the polymerizer along its axis. The agitating speed of agitator A is set to 50 R.P.M. and that of agitator B to 5 R.P.M. The temperature of the reaction medium is rapidly brought to 55° C. and kept there; this corresponds to a relative pressure of 7.8 bars in the polymerizer.

After 4.20 hours of polymerization at 55° C., the temperature of the water circulating in the double jacket of the polymerizer is brought to 75° C. and the copolymer is degassed.

The monomeric composition to be eliminated is first brought to an absolute pressure of 4 bars by direct degassing in 30 minutes. A compressor is then used to bring it to 90 mm of mercury, and it is kept at that pressure until degassing is over.

The temperature of the polymer, which rose to 75° C. seven minutes after water at 75° C. had been put in circulation in the double jacket of the polymerizer, is kept at 75° C. until degassing is over. The degassing process takes 100 minutes.

When the polymer has been degassed and the vacuum broken by the introduction of nitrogen, the vinyl chloride/vinyl acetate copolymer in the polymerizer is found to contain 400 ppm of residual monomeric vinyl chloride.

206 kg of the copolymer is collected, made up of 99% by weight of vinyl chloride and 1% by weight of vinyl acetate, with an AFNOR viscosity index of 103. The proportion of copolymer passing through a screen with a mesh size of 630 microns represents 98% by weight and has an apparent weight per unit volume of 0.63 g/cm$^3$ and a grain size distribution with an average diameter of 140 microns.

EXAMPLE 6

Polymerization conditions are identical with those in Example 5.

After 4.20 hours of polymerization at 55° C., the temperature of the water circulating in the double jacket of the polymerizer is brought to 75° C. and the copolymer is degassed.

The monomeric composition to be eliminated is first brought to an absolute pressure of 4 bars by direct degassing in 30 minutes, then to a pressure of 90 mm of mercury with the aid of the compressor used in Example 5.

When the residual monomeric vinyl chloride content of the copolymer in the polymerizer drops below 2000 ppm (this happens 20 minutes after the compressor has been set in operation, 325 g of water is fed into the polymerizer. The pressure in the polymerizer is restored to 90 mm of mercury and kept at that level until degassing is over.

The temperature of the polymer, which rose to 75° C. seven minutes after water at 75° C. had been put into circulation in the double jacket of the polymerizer, is kept at 75° C. until degassing is over. The degassing process takes 100 minutes.

When the polymer has been degassed and the vacuum broken by the introduction of nitrogen, the vinyl chloride/vinyl acetate copolymer in the polymerizer is found to contain 5 ppm of residual monomeric vinyl chloride.

206 kg of the copolymer is collected, made up of 99% by weight of vinyl chloride and 1% by weight of vinyl acetate, with an AFNOR viscosity index of 103. The proportion of copolymer passing through a screen with a mesh size of 630 microns represents 98% by weight and has an apparent weight per unit volume of 0.63 g/cm$^3$ and a grain size distribution with an average diameter of 142 microns.

EXAMPLE 7

This example is given as a comparison.

The apparatus is the same as that used in Example 5.

135 kg of vinyl chloride is introduced in the prepolymerizer and the apparatus is purged by degassing 10 kg of vinyl chloride. 1.875 kg of isobutene, 6.9 g of acetylcyclohexane sulphonyl peroxide, corresponding to 0.5 g of active oxygen, and 16.7 g of ethyl peroxydicarbonate, corresponding to 1.5 g of active oxygen, are also introduced. The agitating speed is set to 400 R.P.M.

The temperature of the reaction medium in the prepolymerizer is brought to 69° C. and kept at that level; this corresponds to a relative pressure of 11.2 bars in the prepolymerizer.

After 30 minutes of pre-polymerization, the conversion rate being approximately 10%, the pre-polymer is transferred to the polymerizer, which has been purged at a preliminary stage by degassing 20 kg of vinyl chloride. It now contains 130 kg of vinyl chloride, 1.9 kg of isobutene, 41.7 g of acetylcyclohexane sulphonyl peroxide, corresponding to 3.0 g of active oxygen, and 66.7 g of ethyl peroxydicarbonate, corresponding to 6.0 g of active oxygen. The agitating speed of agitator A is set to 50 R.P.M. and that of agitator B to 5 R.P.M. The temperature of the reaction medium is brought rapidly to 55° C. and kept at that level; this corresponds to a relative pressure of 8 bars in the polymerizer.

After 5 hours of polymerization at 55° C., the copolymer obtained is degassed under the conditions described in Example 5.

When it has been degassed and the vacuum broken by the introduction of nitrogen, the vinyl chloride/isobutene copolymer in the polymerizer is found to contain 380 ppm of residual monomeric vinyl chloride.

200 kg of the copolymer is collected, made up of 99% by weight of vinyl chloride and 1% by weight of isobutene, with an AFNOR viscosity index of 99. The proportion of copolymer passing through a screen with a mesh size of 630 microns represents 97% by weight and has an apparent weight per unit volume of 0.62 g/cm$^3$ and a grain size distribution with an average diameter of 139 microns.

EXAMPLE 8

Polymerization conditions are identical with those in Example 7 and degassing conditions identical with those in Example 6.

When the polymer has been degassed and the vacuum broken by the introduction of nitrogen, the vinyl chloride/isobutene copolymer in the polymerizer is found to contain 3 ppm of residual monomeric vinyl chloride.

200 kg of the copolymer is collected, made up of 99% by weight of vinyl chloride and 1% by weight of isobutene, with an AFNOR viscosity index of 99. The proportion of copolymer passing through a screen with a mesh size of 630 microns represents 97% by weight and has an apparent weight per unit volume of 0.62 g/cm$^3$ and a grain size distribution with an average diameter of 140 microns.

EXAMPLE 9

This example is given as a comparison.

The apparatus is that used in Example 5.

135 kg of vinyl chloride is placed in the pre-polymer and the apparatus is purged by degassing 10 kg of vinyl chloride. 3.125 kg of propylene, 8.3 g of acetylcyclohexane sulphonyl peroxide, corresponding to 0.6 g of active oxygen, and 22.2 g of ethyl peroxydicarbonate, corresponding to 2.0 g of active oxygen, are also introduced. The agitating speed is set to 400 R.P.M. The temperature of the reaction medium in the prepolymerizer is brought to 69° C. and kept at that level; this corresponds to a relative pressure of 12 bars in the prepolymerizer.

After 30 minutes of pre-polymerization, the conversion rate being approximately 10%, the pre-polymer is transferred to the polymerizer, which has been purged at a preliminary stage by degassing 20 kg of vinyl chloride. It now contains 130 kg of vinyl chloride, 3.3 kg of propylene, 69.4 g of acetylcyclohexane sulphonyl peroxide, corresponding to 5.0 g of active oxygen, and 100.1 g of ethyl peroxydicarbonate, corresponding to 9.0 g of active oxygen. The agitating speed of agitator A is set to 50 R.P.M. and that of agitator B to 5 R.P.M. The temperature of the reaction medium is brought rapidly to 55° C. and kept at that level; this corresponds to a relative pressure of 8.4 bars in the polymerizer.

After 5 hours of polymerization at 55° C., the copolymer obtained is degassed under the conditions described in Example 5.

When the copolymer has been degassed and the vacuum broken by the introduction of nitrogen, the vinyl chloride/propylene copolymer in the polymerizer is found to contain 410 ppm of residual monomeric vinyl chloride.

198 kg of the copolymer is collected, made up of 99% by weight of vinyl chloride and 1% by weight of propylene, with an AFNOR viscosity index of 100. The proportion of copolymer passing through a screen with a mesh size of 630 microns represents 97% by weight; it has an apparent weight per unit volume of 0.63 g/cm$^3$ and a grain size distribution with an average diameter of 142 microns.

EXAMPLE 10

Polymerization conditions are identical with those in Example 9 and degassing conditions identical with those in Example 6.

When the copolymer has been degassed and the vacuum broken by the introduction of nitrogen, the vinyl chloride/propylene copolymer in the polymerizer is found to contain 4 ppm of residual monomeric vinyl chloride.

198 kg of the copolymer is collected, made up of 99% by weight of vinyl chloride and 1% by weight of propylene, with an AFNOR viscosity index of 100. The proportion of copolymer passing through a screen with a mesh size of 630 microns represents 97% by weight; it has an apparent weight per unit volume of 0.63 g/cm$^3$ and a grain size distribution with an average diameter of 142 microns.

EXAMPLE 11

This example is given as a comparison.

The apparatus is that used in Example 5.

135 kg of vinyl chloride is placed in the prepolymerizer and the apparatus is purged by degassing 10 kg of vinyl chloride. 5 kg of vinyl acetate, 11.1 g of acetylcyclohexane sulphonyl peroxide, corresponding to 0.8 g of active oxygen, and 7.8 g of ethyl peroxydicarbonate, corresponding to 0.7 g of active oxygen, are also introduced. The agitating speed is set to 400 R.P.M.

The temperature of the reaction medium in the prepolymerizer is brought to 70° C. and kept at that level; this corresponds to a relative pressure of 11.3 bars in the prepolymerizer.

After 25 minutes of pre-polymerization, with a conversion rate of approximately 10%, the pre-polymer is transferred to the polymerizer, which has been purged at a preliminary stage by degassing 20 kg of vinyl chloride. It now contains 113.7 kg of vinyl chloride, 4.3 kg of vinyl acetate, 7 kg of propylene, 69.4 g of acetylcyclohexane sulphonyl peroxide, corresponding to 5.0 g of active oxygen, and 122.4 g of ethyl peroxydicarbonate, corresponding to 11.0 g of active oxygen. The agitating speed of agitator A is set to 50 R.P.M. and that of agitator B to 5 R.P.M. The temperature of the reaction medium is brought rapidly to 55° C. and kept at that level; this corresponds to a relative pressure of 8.4 bars in the polymerizer.

After 6 hours of polymerization at 55° C., the copolymer obtained is degassed under the conditions described in Example 5.

When the copolymer has been degassed and the vacuum broken by the introduction of nitrogen, the vinyl chloride/vinyl acetate/propylene copolymer in the polymerizer is found to contain 370 ppm of residual monomeric vinyl chloride.

203 kg of the copolymer is obtained; it is of the following composition by weight:
 -vinyl chloride:97%
 -vinyl acetate:2%
 -propylene-:1% and has an AFNOR viscosity index of 94. The proportion of copolymer passing through a screen with a mesh size of 630 microns represents 96.5% by weight, and has an apparent weight per unit volume of 0.62 g/cm$^3$ and a grain size distribution with an average diameter of 140 microns.

EXAMPLE 12

Polymerization conditions are identical with those in Example 11 and degassing conditions identical with those in Example 6.

When the copolymer has been degassed and the vacuum broken by the introduction of nitrogen, the vinyl chloride/vinyl acetate/propylene copolymer in the polymerizer is found to contain 3 ppm of residual monomeric vinyl chloride.

203 kg of the copolymer is collected; it is of the following composition by weight:
 -vinyl chloride:97%
 -vinyl acetate:2%
 -propylene-1% and has an AFNOR viscosity index of 94. The proportion of copolymer passing through a screen with a mesh size of 630 microns represents 96.5% by weight and has an apparent weight per unit volume of 0.62 g/cm$^3$ and a grain size distribution with an average diameter of 140 microns.

EXAMPLE 13

This example is given as a comparison.

Polymerization conditions are identical with those in Example 6.

The apparatus is that used in Example 6.

After 4.20 hours of polymerization at 55° C., the temperature of the water circulating in the double jacket of the polymerizer is brought to 85° C. and the copolymer is degassed under the same conditions as in the method disclosed in Applicants' French Patent Application, National Registration No. 75.06291.

The monomeric composition to be eliminated is first brought to an absolute pressure of 4 bars by direct degassing in 7 minutes. It is then brought to 90 mm of mercury with the aid of the compressor and is kept at that pressure until degassing is over.

The temperature of the polymer, which rose to 75° C. ten minutes after water had been put into circulation at 85° C. in the double jacket of the polymerizer, is kept at 75° C. until degassing is over. The degassing process takes 90 minutes.

When the polymer has been degassed and the vacuum broken by the introduction of nitrogen, the vinyl chloride/vinyl acetate copolymer in the polymerizer is found to contain 320 ppm of residual monomeric vinyl chloride.

206 kg of the copolymer is collected, made up of 99% by weight of vinyl chloride and 1% by weight of vinyl acetate, with an AFNOR viscosity index of 103. The proportion of copolymer passing through a screen with a mesh size of 630 microns represents 98% by weight and has an apparent weight per unit volume of 0.63 g/cm$^3$ and a grain size distribution with an average diameter of 140 microns.

We claim:

1. A method of degassing polymers and copolymers prepared by polymerizing in mass a monomeric composition based on vinyl chloride, agitating the formed polymer, bringing the gas phase of the remaining monomeric composition from polymerization pressure to a pressure below 120 mm of mercury and the polymer to a temperature of at least 70° C. but below the temperature at which degradation of the polymer or copolymer commences, maintaining these conditions of pressure and temperature substantially until the residual vinyl chloride monomer content of the polymer has been reduced to a level below 2000 ppm. contacting the polymer which has been reduced to a residual vinyl chloride monomer content to a level below 2000 ppm with a quantity of water representing 0.01% to 0.8% by weight of the polymer while continuing to maintain the temperature and pressure conditions as described above until the residual monomeric vinyl chloride content of the polymer is less than 50 ppm.

2. The method as claimed in claim 1 in which the amount of water is 0.05% to 0.5% by weight of the polymer.

3. The method as claimed in claim 1 which includes the step of contacting the polymer with an inert gas during the degassing process and after the monomeric composition to be eliminated has been brought to a pressure below 120 mm of mercury.

4. The method as claimed in claim 3 in which the inert gas is nitrogen gas.

5. The method as claimed in claim 1, in which the pressure and temperature conditions are maintained after the water addition until the residual monomeric vinyl chloride content is less than 20 ppm.

6. The method as claimed in claim 1, in which the pressure and temperature conditions are maintained after the water addition until the residual monomeric vinyl chloride content is as low as 1 ppm.

* * * * *